A. T. KOPPE.
MACHINE FOR MAKING OFFSET PRESS PLATES.
APPLICATION FILED AUG. 12, 1916.

1,277,429.

Patented Sept. 3, 1918.
7 SHEETS—SHEET 1.

INVENTOR
Alexander T. Koppe
BY
George J. Ottsch
ATTORNEY

A. T. KOPPE.
MACHINE FOR MAKING OFFSET PRESS PLATES.
APPLICATION FILED AUG. 12, 1916.

1,277,429.

Patented Sept. 3, 1918.
7 SHEETS—SHEET 2.

INVENTOR
Alexander T. Koppe,
BY
George J. Ottsch
ATTORNEY

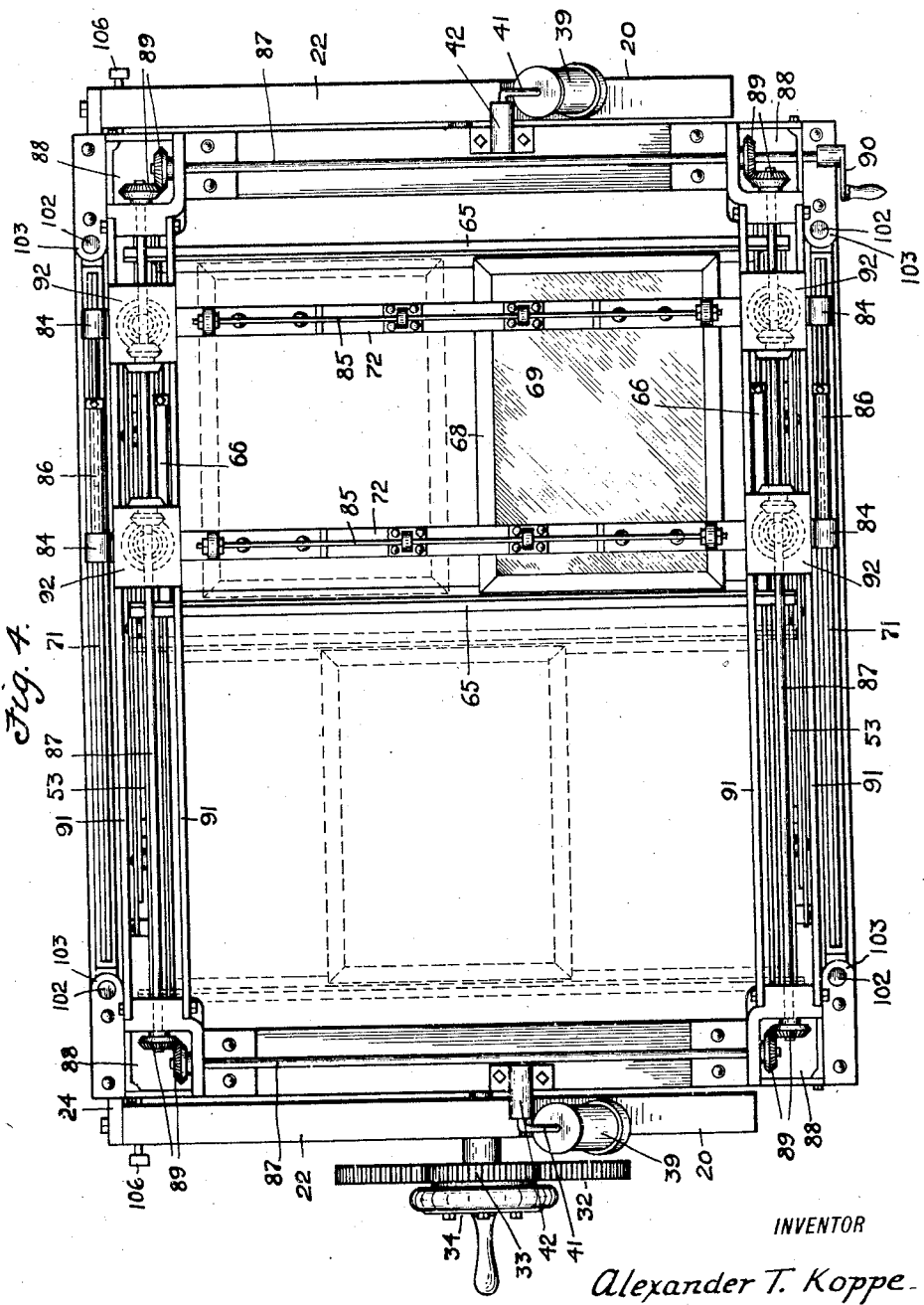

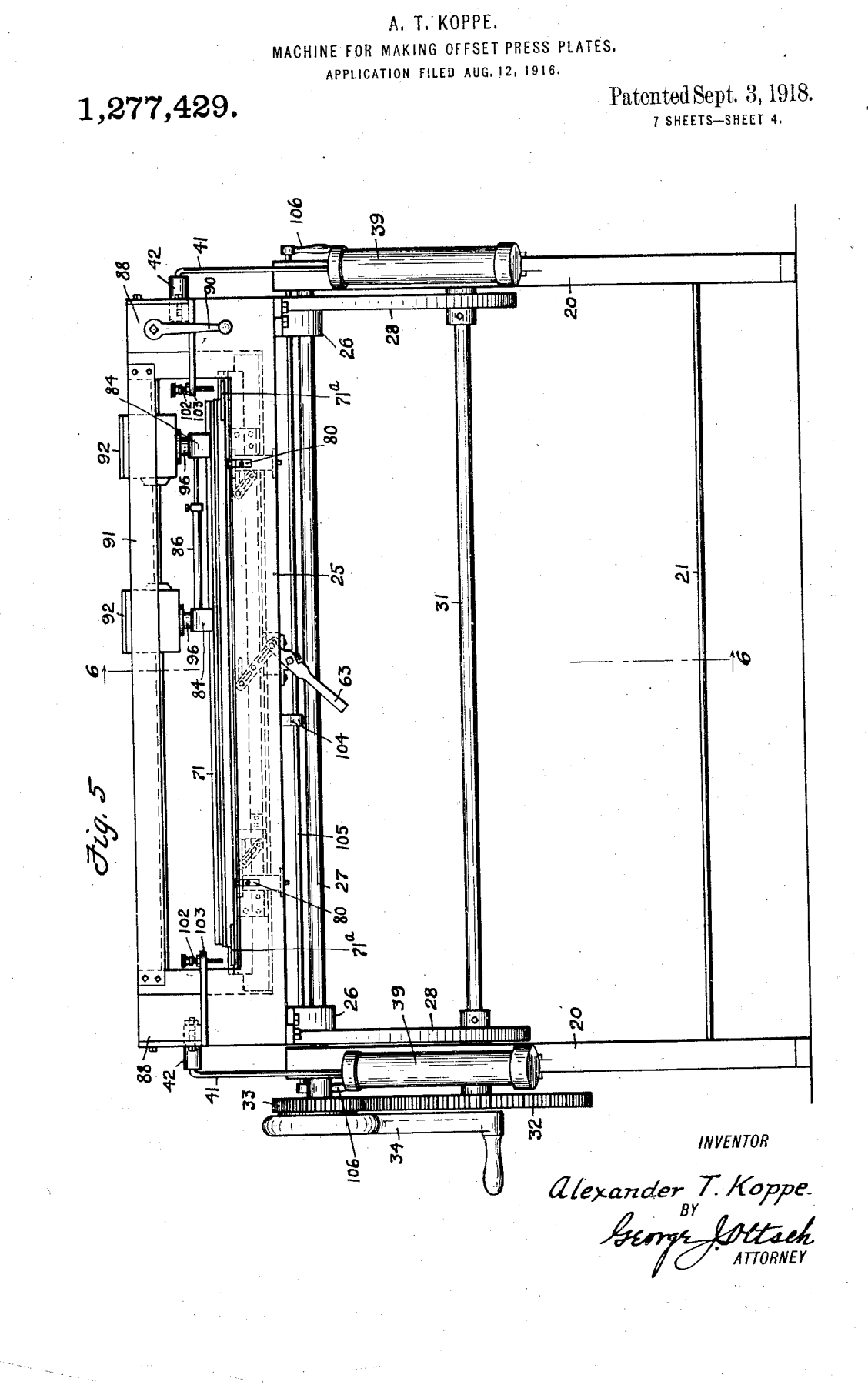

A. T. KOPPE.
MACHINE FOR MAKING OFFSET PRESS PLATES.
APPLICATION FILED AUG. 12, 1916.

1,277,429.

Patented Sept. 3, 1918.
7 SHEETS—SHEET 4.

INVENTOR
Alexander T. Koppe.
BY
George J. Oltsch
ATTORNEY

A. T. KOPPE.
MACHINE FOR MAKING OFFSET PRESS PLATES.
APPLICATION FILED AUG. 12, 1916.
1,277,429.
Patented Sept. 3, 1918.
7 SHEETS—SHEET 5.
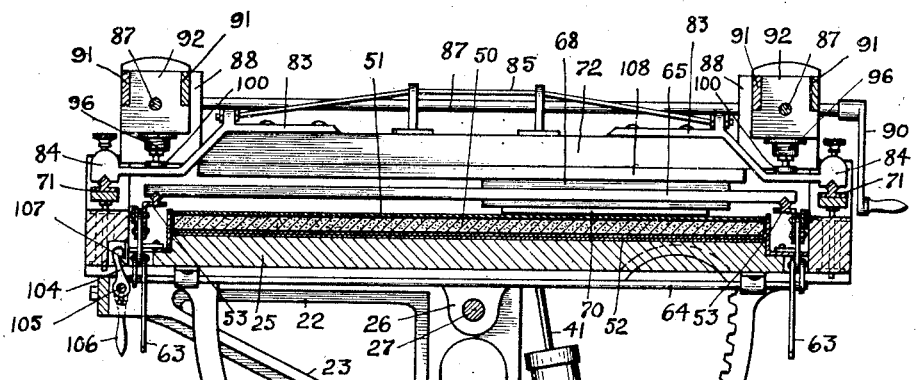
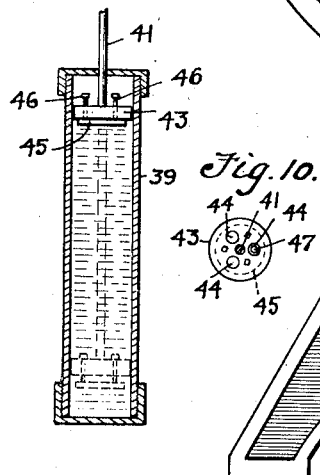
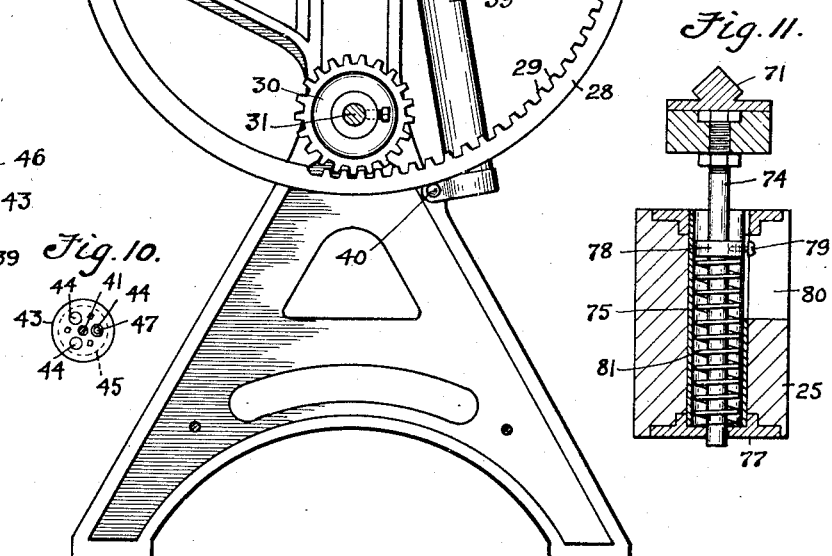
INVENTOR
Alexander T. Koppe.
BY
George J. Oltsch
ATTORNEY A. T. KOPPE.
MACHINE FOR MAKING OFFSET PRESS PLATES.
APPLICATION FILED AUG. 12, 1916.

1,277,429.

Patented Sept. 3, 1918.
7 SHEETS—SHEET 6.

INVENTOR
Alexander T. Koppe,
BY
George J. Ottoch
ATTORNEY

A. T. KOPPE.
MACHINE FOR MAKING OFFSET PRESS PLATES.
APPLICATION FILED AUG. 12, 1916.

1,277,429.

Patented Sept. 3, 1918.
7 SHEETS—SHEET 7.

INVENTOR
Alexander T. Koppe,
BY
George J. Ottsch
ATTORNEY

UNITED STATES PATENT OFFICE.

ALEXANDER T. KOPPE, OF SOUTH BEND, INDIANA, ASSIGNOR TO OFFSET DIRECTO-PLATE COMPANY, OF CHICAGO, ILLINOIS, A CORPORATION OF ILLINOIS.

MACHINE FOR MAKING OFFSET PRESS-PLATES.

1,277,429.   Specification of Letters Patent.   Patented Sept. 3, 1918.

Application filed August 12, 1916. Serial No. 114,523.

*To all whom it may concern:*

Be it known that I, ALEXANDER T. KOPPE, a citizen of the United States, residing at South Bend, in the county of St. Joseph and State of Indiana, have invented certain new and useful Improvements in Machines for Making Offset Press-Plates, of which the following is a specification.

The invention relates to a machine for photographically preparing press plates for use in offset printing, being constructed with a view to adapting it for a single or multiple reproduction on the press plate with absolute accuracy of placement and with economy of time and labor.

As commonly carried out the process of preparing such plates consists in first preparing a negative on a glass plate, making a reproduction therefrom on a sensitized sheet of zinc by the usual printing process, taking an impression from the zinc plate on transfer paper in numbers corresponding to the number of reproductions to be produced on the press plate, and thence retransferring from the transfer paper to the press plate, all in the manner as is now well understood in the art. The use of transfer paper is necessitated for multiple reproduction on the press plate in order that the subject to be produced in multiple by each printing operation can be properly and relatively spaced on the printed sheet, so that the sheet may be cut into smaller sheets in a manner so that the printed subject will appear on such smaller sheets in the desired position. Also in multi-color printing from press plates it is necessary that the multi printing surfaces on each color plate be exactly similar with respect to relative location and spacing, in order that proper registration between the different color impressions be had.

The function of the transfer sheets is thus to facilitate the transfer of the impression taken thereon to the proper position on the press plate, the latter being previously supplied with register marks to indicate the location on said plate at which the transfer is to be made, the application of the transfer sheet upon the press plate permitting the placement of the sheet with reference to the register marks to be plainly seen. It is for the reason that in the use of the old type of printing frame, in which the zinc plate is pressed in back of the negative so that the relative position of the plate and negative can not be seen except through the glass side of the printing frame, so that said parts can not be placed without requiring numerous adjustments, that the transfer method is employed.

My invention involves the use of means permitting the making of press plates for offset printing in which the subject of the negative is directly reproduced upon the press plate by sensitizing the press plate, and in the use of which means the negative may be easily and quickly applied with respect to any predetermined position on the plate, so that numerous reproductions of the same or other negatives may be made on a single press plate with exact precision with respect to relative disposition of such reproductions. By thus printing the negative direct on the press plate I eliminate entirely the transfer method heretofore referred to, thus materially shortening the time and reducing the labor heretofore required in preparing press plates by the transfer method.

In the use of the present invention the press plate is utilized as a fixed element, same being sensitized, and the negative is initially applied upon the sensitized surface of the plate in exact accord with a predetermined registry or outline, and the negative then clamped upon the press plate, the clamping means permitting the passage of light to and through the negative. The negative being freely movable with respect to the press plate, and any register marks on the plate plainly visible, it is evident that repeated applications of the negative on a single plate may be easily and quickly made in accordance with such register marks.

As the machine forming the subject matter of the present invention and designed with a view to carrying out the above noted method of procedure, contemplates the preparation of press plates for multiple reproduction, as well as single, it is apparent that such machine must include a means whereby the transparent clamping member may be readily adjusted to cover any portion of the press plate, and that such means must of necessity be adjustable to accommodate clamping members of different sizes. Furthermore, the structure must include means whereby uniform and even clamping of the member upon the negative may be secured in whatever position such clamping member may be disposed with respect to the press plate area.

The invention in the preferred form of details will be described in the following specification, reference being had to the accompanying drawings, in which:

Fig. 4 is a plan view of the machine with the parts ready for an exposure or reproduction;

Fig. 5 is a side view of the same;

Fig. 6 is a vertical sectional view of the same taken on the line 6—6 of Fig. 5;

Fig. 9 is a vertical section of the retarding means for preventing a too rapid movement of the carrying frame from normal to operative position;

Fig. 10 is a plan view of the piston of such retarding means;

Fig. 11 is a vertical sectional view illustrating the lifting means and tracks for the clamping bars;

The improved machine in that embodiment of details at present considered best adapted for carrying out the object sought, involves generally a bed frame on which is mounted for limited movement a tilting frame, the latter being movable from an approximately horizontal position on the bed frame to a position approximately vertically for exposure, the movement from the horizontal or normal position to the vertical or operative position being effected by gravity, controlled through a retarding device, the movement from the operative or vertical position to the normal or horizontal position being actuated through coöperating gear members by means of a clutch controlled handle. The tilting frame has a substantial bed plate on which the press plate is positioned, a transparent clamping member being adapted for movement at the will of the operator lengthwise of slideways, which latter may be spaced apart and locked in such spaced relation to accommodate different widths of clamping members, and which slideways are in themselves adapted for travel longitudinally of the tilting frame upon suitable trackways, the said trackways being simultaneously adjustable to and from the bed plate at will to arrange the clamping member into a position above and free of or in a position in contact with the negative. Clamping bars are also supported upon the tilting frame and arranged to overlie the clamping member, the clamping bars being adapted for manual adjustment to space them apart in accordance with the width of the particular clamping member, and being manually movable on trackways to any position transversely of the tilting frame so that they may be brought into accord with the clamping member in whatever position the latter may be placed on the bed plate, the clamping bars having coöperating means, whereby they may be forced down upon the clamping member with desired pressure to secure it absolutely uniform and proper pressure contact upon the negative.

In detail, the present machine comprises a bed plate including legs 20, connected by tie rods 21, and having at the upper ends laterally or rearwardly extending bars 22, braced from the legs at 23, and connected at their rear or free ends by a tie bar 24, the bars 22 constituting what will be hereinafter termed the bed frame of the machine.

Figure 1:
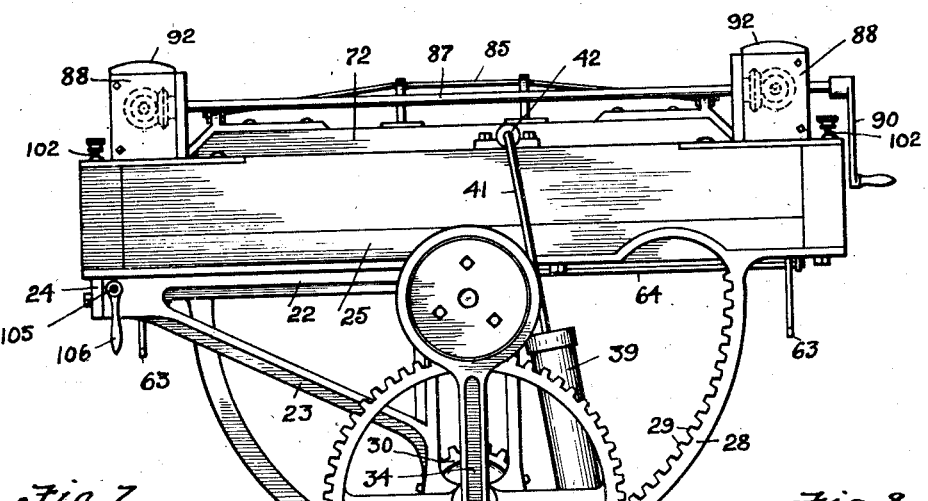
Figure 1 is an end elevation of the improved machine with the parts in normal position, that is, in the position occupied immediately succeeding the arrangement thereof for a reproduction.
Figures 7, 8:
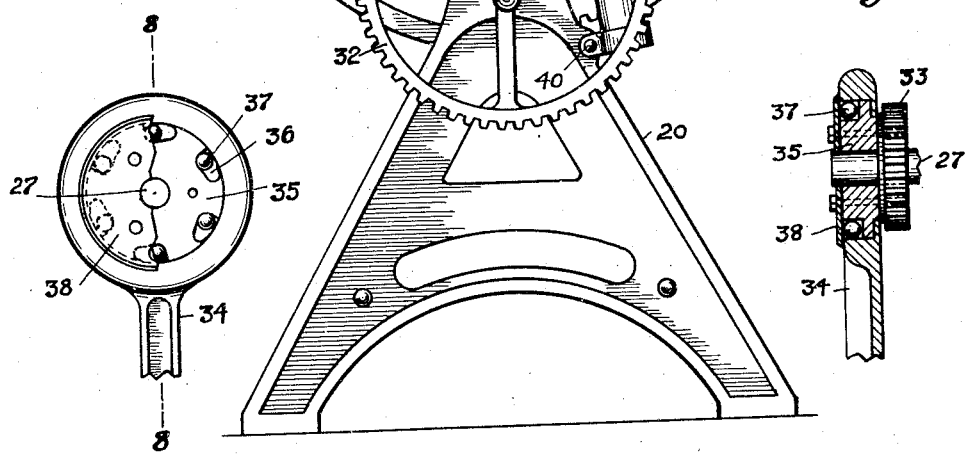
Fig. 7 is a broken elevation.
Fig. 8 is a vertical section of the connection of the crank handle and operating gear for returning the tilting frame into normal position.
Figure 2:
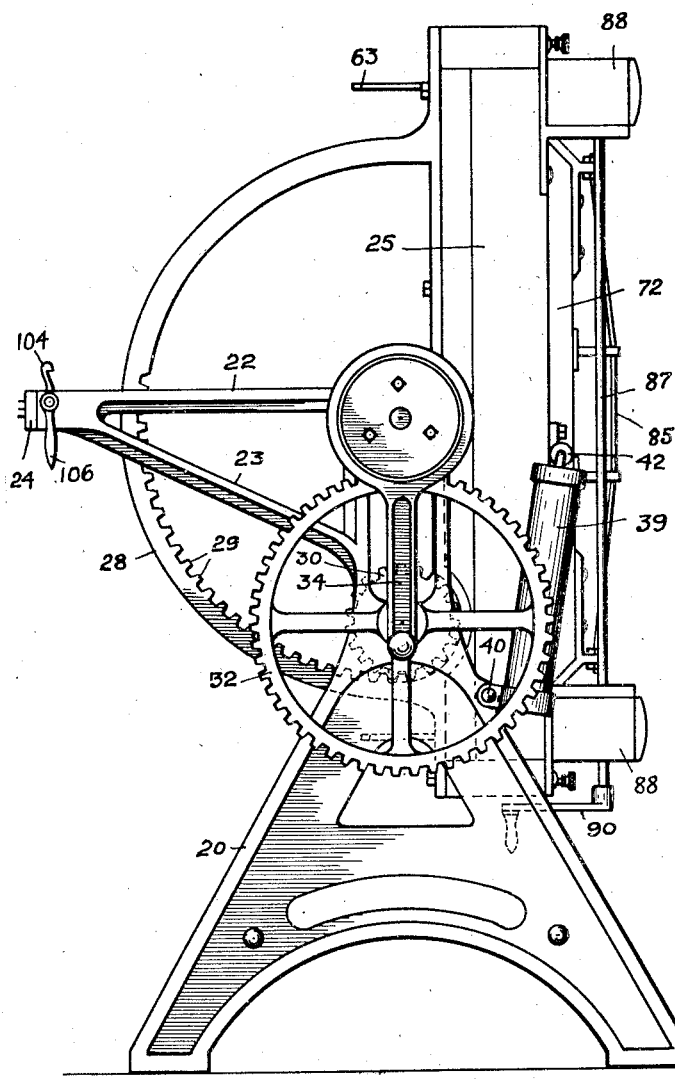
Fig. 2 is a similar view with the carrier frame and connected parts in operative position, that is, the position assumed in making an exposure.

The tilting frame, which as before stated, is movable with respect to the bed frame, includes generally a base 25 preferably constructed of wood, suitably braced as desired and specifically formed at determinate points as will hereinafter appear to accommodate the various operating parts of the structure. The base is provided adjacent the respective ends, and approximately centrally of the width thereof with depending ears 25, and these latter are pivotally connected at appropriate points to the legs 20, preferably by a shaft 27, which extends lengthwise of the machine. Depending from the base of the tilting frame adjacent each end thereof, preferably in the plane of the legs 20, is a segmental or semi-circular rack bar 28, the teeth 29 on the inner peripheral edge of which engage a pinion 30 fixed upon each terminal of a shaft 31, extending lengthwise the machine and appropriately mounted in the leg portions. The shaft 31 extends through and beyond one of the legs and is terminally provided with a gear 32 in mesh with a pinion 33, preferably mounted upon the pivot shaft 27. The pinion 33 is adapted to be manually operated through a suitable crank handle as 34 and the latter, as will be plain from Figs. 7 and 8 of the drawings, is arranged for clutch connection with the pinion, so that the handle when operated in one direction will operate the pinion, while the latter is free to move in the opposite direction without influencing the handle. This result is secured by fixing to the pinion 33 a disk 35, on which the hub or sleeve of the crank handle 34 is rotatably mounted. At appropriate intervals the peripheral edge of the disk is cut out to form recesses 36 of gradually reduced width in one direction circumferentially of the disk, these recesses being designed to receive balls 37, having a diameter slightly exceeding the minimum width of the recess. The balls are placed between the bottom of the recess and the inner surface of the handle hub or sleeve, a plate 38 being secured to the disk to retain the balls in place. The handle when moved in one direction will thus automatically clutch the disk and so operate the pinion, the disk and pinion being however free to move in the opposite direction without affecting the handle. As the handle is rotated in one direction it is apparent through the pinion 33 operating to drive the gear 32 and the latter through the shaft 31 operating the pinions 30, said pinions will, through engagement with the teeth 29 of the rack 28, turn the tilting frame on its pivotal support. The clutch members, it will be noted, are arranged so that the clutching coöperation of the handle with the disk is secured in that movement of the handle as will so operate the gears as to return the tilting frame from operative position to normal position, that is, resting upon the bed plate, it being the purpose of the invention to permit the tilting frame to move from the normal or horizontal position to the operative or vertical position by gravity, the tilting frame having its initial movement toward operative position imparted thereto by hand. As the tilting frame is designed to move to operative position by gravity, I have provided a means for retarding such movement of the tilting frame with a view to permitting a uniform gradual movement and to avoid shocks and jars incident to a too rapid movement or stopping of such frame. This retarding means is illustrated more particularly in Figs. 9 and 10, and as here shown includes a cylinder 39 pivotally connected at 40 at its lower end to the legs, there being such a retarding means at each end of the machine. The cylinder is closed at the upper end except for an opening to permit the passage therethrough of a piston rod 41 connected at its upper end at 42 to an appropriate part of the tilting frame. Within the cylinder 39 and secured to the lower end of the piston rod is a piston 43 having a series of openings, (three being shown), as 44, therein. The valve disk 45 is arranged beneath the piston and limited in movement by pins 46 which extend through the piston and are headed above the same as shown. The valve disk 45 is formed with a single opening as 47 which is adapted to register with one of the openings 44, the valve disk being otherwise imperforate. The cylinder 39 is adapted to contain fluid such as oil to a level normally occupied by the piston when the tilting frame is in normal horizontal position. As the tilting frame moves by gravity to an operating position, the piston is forced downward, the pressure of the fluid causing the valve disk to contact snugly with the lower surface of the piston and close all of the openings 44, except the one in registry with the opening 47, in the valve disk. The leakage of the fluid to the opposite side of the piston is therefore permitted only through this one opening and the descent of the tilting frame to operative position is gradual, the speed being determined by the size of the opening. On the manual return of the tilting frame to normal position, however, the valve disk moves from contact with the piston permitting the fluid accumulating above the piston to flow to the opposite side of the piston through all of the piston openings 44 permitting a much more rapid movement of the piston and hence such movement as is practically not affected by the retarding device.

The base 25 of the tilting frame is reduced at its marginal edges as at 48 to receive a metallic L-shaped marginal flange, the upright 49 of which extends above the upper surface of the base 25 to provide for the reception and rigid holding of a slab 50, as of marble or the like, on which the press plate 51 is to be supported. The slab is preferably cushioned upon the base 25 by sheets of suitable material such as blotting paper as at 52. Immediately beyond the flange members 49 and above the same there is supported lengthwise the tilting frame track members 53, preferably of the angled formation shown. These track members are adapted to be simultaneously elevated and lowered at the will of the operator in order to position the negative clamping member, which is movably supported on said members, with relation to the negative. For the purpose of movement of such track members, I secure thereto as at 54, bars 55, which at appropriate intervals are formed with elongated slots 56. Secured to the L-shaped flange below the bar 55 are spaced fixed bars 57, between which and about centrally of the length thereof is pivotally supported a link 58, and adjacent the respective ends thereof are pivotally connected other links 59. The central or operating link 58 extends above and below the pivot, the end links 59 terminating at their lower pivotal supports in the bars 57, and the ends of all the links are connected to an endwise movable bar 60, the pins connecting the links and bar passing through the respective slots 56, and being preferably headed therebeyond. The operating link is formed below its pivotal support with an elongated slot 61, and is operatively connected through such slot and a pin 62 engaging the slot with the upper end of an operating lever 63. The lever is fixed upon the end of a shaft 64 extending transversely of the tilting frame and mounted in suitable bearings to be rotatably supported in position. It being understood that the operating mechanism just described is duplicated at the respective sides of the tilting frame, it is apparent that through movement of either lever 63 the trackways 53 may be elevated or lowered.

Slidably mounted upon the supporting trackways are slide bars 65 preferably of angle construction as shown, and recessed in their underside adjacent their respective ends to accurately coöperate with the tracks 53. Adjacent the respective ends the slide bars are connected for relative spacing at will, through the medium of an adjustable member 66 made up of telescopic members held in adjusted relation through a set screw 67. By this means the respective slide bars may be spaced apart a predetermined distance and secured in such spaced relation to permit their subsequent movement as a unit without liability of disturbing the relative positions of the bars. As previously stated the slide bars are formed of angle formation and thus present slideways adapted to receive what will be hereinafter termed the negative clamping element. For the purposes of this invention such element is here shown as a frame 68, of wood or the like, having the side marginal edges thereof formed for accurate coöperation with the receiving portions of the slideways. The frame 68 is of open construction, and comparatively thick, being thus designed to receive a transparent clamping member 69, as of plate glass or the like, the main requirement of which is that it must be sufficiently clear to permit direct passage of the rays of light without interference. This clamping member being subjected to direct clamping action to hold the negative in place on the press plate must of necessity be of sufficient thickness to stand the strain incident to such clamping action. The clamping member, considering the transparent glass and the frame as an entirety, is readily movable to any position longitudinally of the slide bars and the latter through the track connection described are capable of movement to any position longitudinally the tilting frame. Under these conditions it is apparent that the negative clamping member may be positioned at any point above the press plate 51, so that the negative 70 which is designed to be placed directly upon the press plate, may be accurately engaged by the clamping member in whatever position said negative may be upon the press plate. Furthermore, the convenient means for the relative spacing of the slideways provides for their adaptation for clamping members of varying sizes, thus conveniently and readily accommodating the machine to negatives of greater or less dimensions as may be required in the particular instance. As will be apparent from Fig. 14 of the drawings, the frame carrying the clamping member *per se*, as well as such member is of materially greater thickness than the similar dimensions of the slideways, so that when said member is lowered upon the negative, as is done through lowering the tracks 53 in the manner previously described, the clamping member alone will rest upon the negative, the remaining connected parts being maintained at all times in spaced relation to the press plate.

In connection with the clamping member, there is provided a means within control of the operator by which said member may be clamped or forced upon the negative with the requisite pressure to secure said negative in an accurate contact with the press plate. The means provided including clamping bars and mechanism for operating the same, with such means particularly constructed to insure an even distribution of pressure as is necessary in accurate work.

Extending longitudinally and beyond the respective side edges of the tilting frame are arranged angularly shaped trackways 71. These trackways are designed to slidably support a pair of clamping bars 72, hereinafter more particularly described, and each trackway at its ends is resiliently supported, so that upon release of the pressure means for the clamping bars, the said bars will be automatically elevated to an inoperative relation with respect to the clamping member. The raising mechanism for the clamping bars is illustrated more particularly in Fig. 11, wherein it will be seen that the ends of each trackway are secured upon the upper ends of rods 74. The rods extend into and through lined vertically extending openings 75, formed in the side edges 76 of the tilting frame. The lower end of each opening therein, is closed by a plate 77, formed with an opening to permit the passage therethrough of the rod 74. Arranged upon each rod is a collar 78, more or less accurately fitting the opening 74, the collar being adjustably secured in place on the rod by a set screw 79, and the frame being formed with recesses 80, through which the set screws are conveniently accessible when it is desired to adjust the collar in its position on the rod. Intermediate the collar and the plate 77 the rod is encircled by a coiled spring 81, which spring is put under compression in the action of the clamping means, and acts to elevate the clamping bars when said bars are relieved of their pressure. The accessibility of the set screws 79 permits convenient adjustment of the spring 81, as will be obvious.

The clamping bars comprise elongated bar members 72, having angle brace bar ends 83, which brace bar ends extend beyond the bars proper and have enlarged terminals 84, formed in their under surface to slidably coöperate with the trackways 71. The respective end brace bars 83 of the respective clamping bars are connected by brace struts 85, to maintain rigidity of the clamping bars in operation. The respective bars are connected for adjustable relative spacing by members 86, including telescopically connected sections held in telescopic relation by a set screw or other locking means, the telescopic members being preferably connected to the enlarged terminals 84 of the clamping bars. This connection between the respective clamping bars, permits spacing of said bars in accordance with the size of the clamping member to be used, in order that the bars may exert a proper pressure upon said member at appropriate points thereof. Furthermore, the connecting means between the clamping bars permits these bars being moved as a unit.

Figure 12:
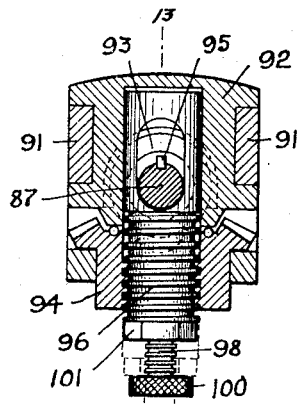
Fig. 12 is a section on line 12—12 of Fig. 13.
Figure 13:
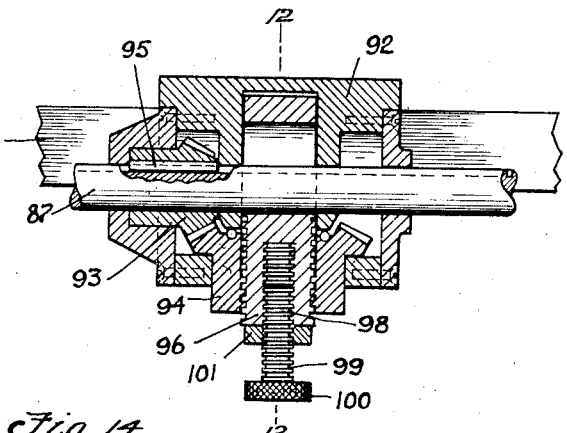
Fig. 13 is a section on line 13—13 of Fig. 12, of the means for exerting a downward or clamping movement of the clamping bars.

The mechanism for exerting a clamping action or downward movement upon the clamping bars is illustrated more particularly in Figs. 4, 12 and 13. The mechanism to induce the downward movement of the clamping bars includes a shaft 87 arranged at each end and side of the tilting frame, above the brace ends 83, of the clamping bars. The respective shafts are mounted at their ends in what may be termed gear housings 88, the shafts within said housings having geared connection at 89. One of the shafts is extended beyond its housing and provided with a crank handle 90, through operation of which all of the shafts may be simultaneously rotated.

Figure 14:
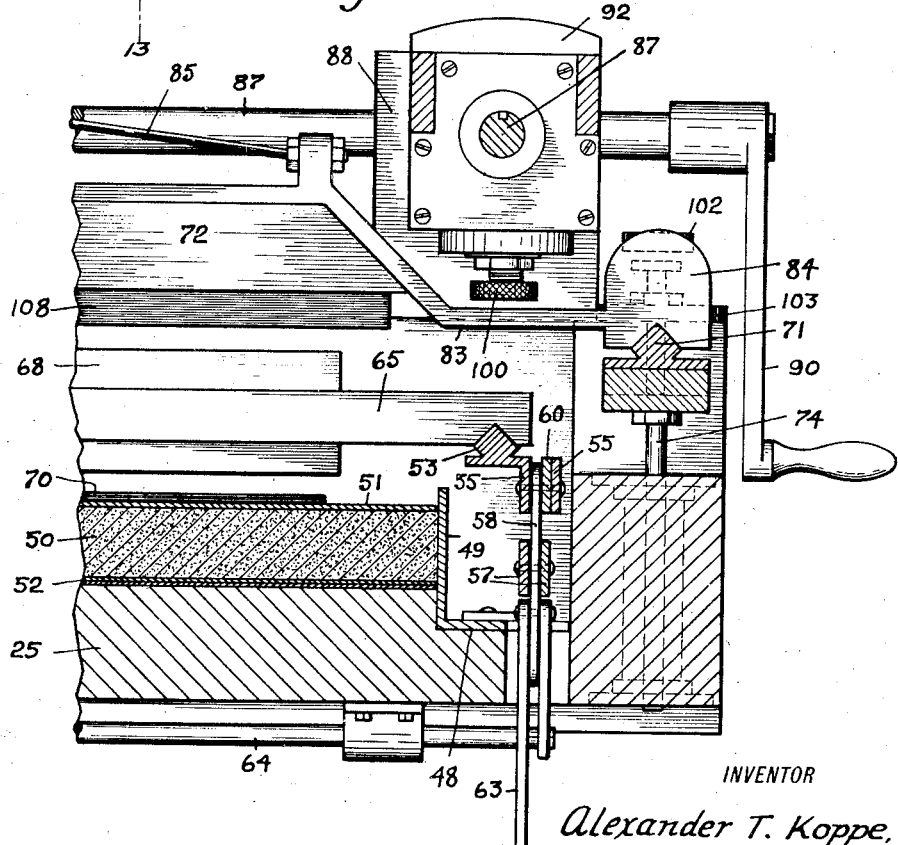
Fig. 14 is an enlarged vertical sectional view through one end of the carrying frame illustrating the various parts for securing the negative in proper clamping relation to the press plate, the negative and press plate being shown in position.
Figure 15:
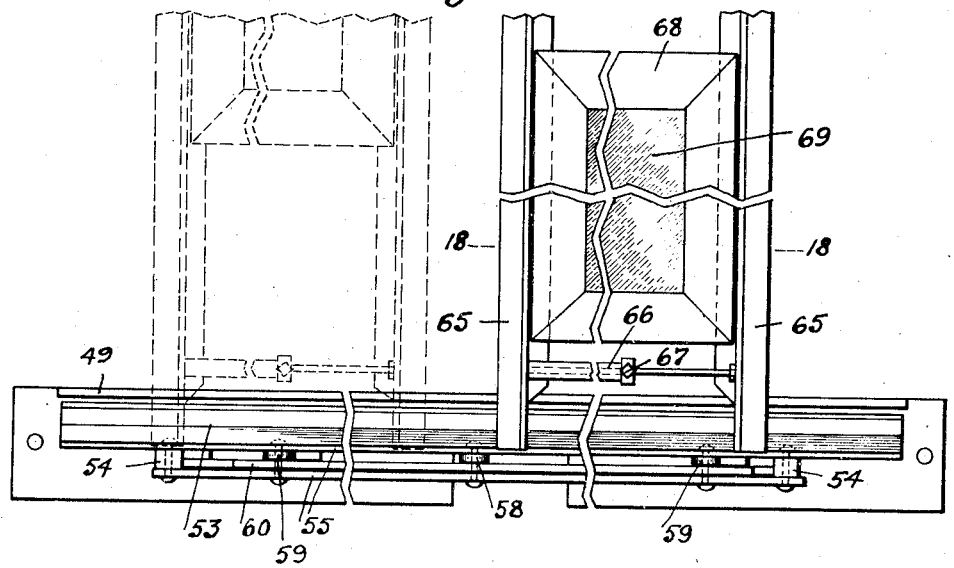
Fig. 15 is an enlarged broken plan illustrating particularly the supporting means and operating means and operating mechanism for the transparent clamping member designed to directly overlie the negative.
Figure 16:
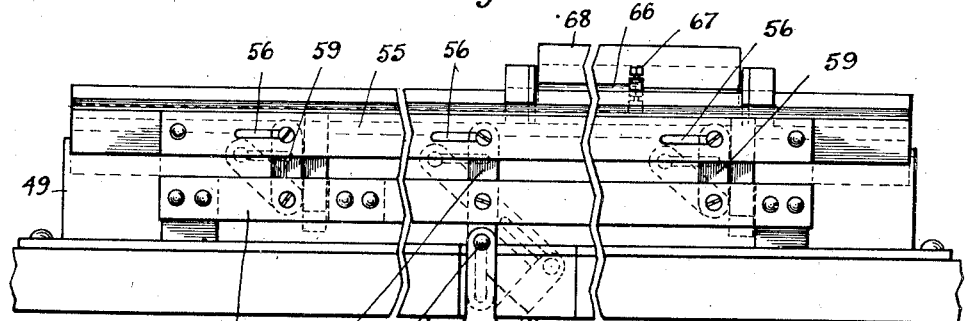
Fig. 16 is a side elevation of the same.
Figure 17:
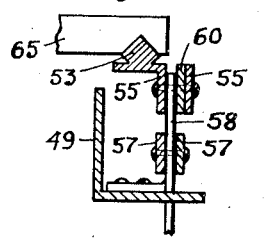
Fig. 17 is a vertical section of the same taken at one side of the operating lever.
Figure 18:
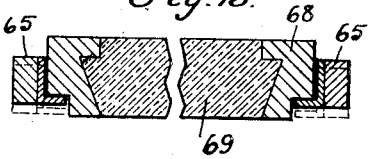
Fig. 18 is a transverse section through the clamping member and slideways therefor.

Secured to the respective gear housings and extending lengthwise the base of the tilting frame are spaced parallel bars 91, on which bars are slidably mounted blocks 92, the blocks being preferably recessed for sliding coöperation with the bars, as more particularly shown in Fig. 14. The shafts 87 pass approximately centrally through the blocks 92, and the said blocks are cored longitudinally and vertically to each receive intermeshing bevel gears 93 and 94. The gear 93 has a key connection at 95 with the particular shaft, the key way in the shaft extending throughout the full length of the movement of the block in its adjustment lengthwise of the tilting frame, so that the blocks are freely movable longitudinally of the respective shaft and on the bars 91 without disturbing the connection of the bevel gears carried by and within the block. The bevel gear 94 is formed with a threaded opening in which is arranged a coöperating threaded post 96, without interfering with the movement of the shaft 87. The post is formed in its lower portion with a threaded opening 98 to receive the threaded stem of a pressure pin 99, having an enlarged head 100, at its lower end, a lock nut 101 engaging the pin to secure the same in adjusted relation in the post 96. As the gear 93 is keyed to the shaft and meshes with the gear 94 which has threaded connection with a post 96, it is obvious that rotation of the shaft 87 will depress or elevate the post in accordance with the direction of rotation of such shaft, and thereby cause the headed end of the pressure pin to move downwardly or upwardly, as the case may be. The blocks 92, of which there is a pair on each pair of bars 91, are adapted to be manually adjusted so that in the particular block the head 100 of the pressure pin rests above an appropriate plane portion of the angle brace 83, of the clamping bar, so that upon rotation of the shafts, which rotation is in unison as previously described, all of the pressure pins will be moved downwardly to force the pressure bars upon the underlying clamping member, and depress the latter into clamping coöperation with the negative, it being understood that prior to the depressing operation of the clamping bars the tracks 53 are lowered by which movement the clamping member is brought into contact and rests upon the negative, although not clamped thereto until subsequent to the action of the clamping bars. Upon release of the clamping bar operating means, the elevating mechanism previously described will lift the clamping bars free of contact with the clamping member, this upward movement of the clamping bars under such elevating mechanism being limited by adjustable stops comprising pins 102, threaded through the free terminals of strips 103, connected to the base of the gear housings, the pins 102 being adjustable in the strips, so that the lower ends of such pins will engage the extended bars 71ᵃ of the tracks 71. The limiting means for upward movement of the clamping bars is particularly desirable as it is necessary to provide a clearance between the clamping bars and pressure pins when the parts are in raised positions, in order that such clamping bars may be shifted to one side or the other to provide convenient access to the clamping member for necessary manipulation of the latter.

The tilting frame is secured in horizontal or normal position upon the bed or supporting frame by latch 104, mounted upon a shaft 105 extending lengthwise of the bed frame, and having operating handles 106 at either end thereof. The latch engages a projection 107, appropriately arranged in the under side of the tilting frame, with the effect to lock said tilting frame in horizontal or normal position, to provide a stable structure for the application of press plate, adjustment of the negative thereon, and securing of the negative in place.

If desired a rubber strip 108 may be secured to the lower surface of the clamping bars, so that said strip will directly engage the clamping member in order to secure a more or less resilient, and at the same time uniform, engagement without liability of breakage of the parts, the resiliency of the strip compensating for any irregularity which might exist in the contacting portions.

Figure 3:
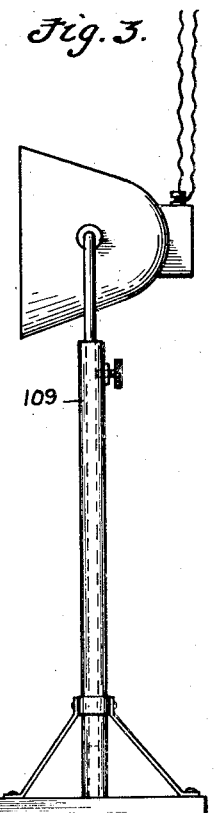
Fig. 3 is a view in elevation showing the light medium for exposure.

As shown in Fig. 3, I have indicated at 109 an electric source of light by which exposure may be made when the tilting frame is in vertical or operative position, the light being preferably provided with a suitable reflector and the illuminating unit proper being vertically adjustable and preferably readily portable in order that it may be adjusted with respect to the particular position of the negative on the press plate.

In the machine described, it will be noted that the negative is the member which is freely movable in its relation to the relatively fixed press plate, thus permitting the negative to be positioned at any predetermined point upon the press plate, such point being plainly visible to facilitate such application. Multiple reproduction is thus readily, easily and economically accomplished on a single plate with accuracy of relative disposition of the reproductions. Furthermore, the slides for supporting the clamping member and also the clamping bar supporting means, are movable to such position when raised or in inoperative position, that they are entirely clear of each other and also of the negative. This permits free and convenient adjustment of either of said parts, or free access to the negative when its removal to a new position is desired.

Having described my invention what I claim as new and desire to secure by Letters Patent, is:—

1. A machine for photographically preparing offset press plates including a base to receive a sensitized press plate, a transparent pressure member adapted to engage and bear upon a negative arranged upon the sensitized surface of said press plate, and independent means for exerting pressure upon said member to clamp the negative upon the fixed press plate.

2. A machine for photographically preparing press plates including a base to receive a sensitized press plate, a transparent pressure member adapted to engage and bear upon a negative arranged upon the sensitized surface of said press plate, and independent and relatively adjustable means for exerting pressure upon said member to clamp the negative upon the fixed press plate.

3. A machine for photographically preparing offset press plates including a base to receive a sensitized press plate, a transparent pressure member mounted for adjustment to various positions within the area of and in a plane parallel to that of the press plate, and independent and relatively adjustable means for exerting pressure upon said member.

4. A machine for photographically preparing offset press plates including a base to support a sensitized press plate, a pressure member adapted to engage and press a negative into contact with the sensitized surface of the press plate, slideways movable with respect to the press plate and adapted to slidably receive and support the pressure member, and means for adjustably spacing the slideways with respect to each other to accommodate pressure members of different sizes.

5. A machine for photographically preparing offset press plates including a base to receive and fixedly support a sensitized press plate, a transparent pressure member adapted to engage and bear upon a negative arranged upon the sensitized surface of said press plate, means for moving the pressure member to and from the press plate, and independent means for exerting pressure upon said member to clamp the negative upon the fixed press plate.

6. A machine for photographically preparing offset press plates including a base to receive and fixedly support a sensitized press plate, a pressure member adapted to engage and bear upon a negative resting upon the sensitized surface of said press plate, means supporting said member to permit adjustment thereof to any position within the area of the press plate, and independent manually operable means for exerting pressure upon said member, said latter means being adjustable to provide for their coöperation with the pressure member in any operative position of the latter.

7. A means for engaging and exerting pressure upon the pressure element of a printing frame comprising bars to engage said element, and independent means for exerting pressure upon each end of each of said bars.

8. A means for engaging and exerting pressure upon the pressure element of a printing frame comprising bars to engage said element, independent means for exerting pressure upon each end of each of said bars, and mechanism for simultaneously operating all of said means.

9. A means for exerting pressure upon a negative engaging element of a printing frame including bars adapted to engage said element, pressure posts to engage the respective ends of each bar, and means for simultaneously operating all of said pressure posts.

10. A means for exerting pressure upon the negative engaging element of a printing frame including bars adapted to engage said element, shafts arranged adjacent the respective ends of the bars and adapted for simultaneous operation, pressure posts to engage and exert pressure upon the respective ends of each of said bars, and means operated by the shafts to actuate the posts.

11. A means for exerting pressure upon the negative engaging element of a printing frame, including bars adapted to engage said element, shafts arranged adjacent the respective ends of the bars and geared for simultaneous movement, blocks slidably mounted upon the shafts, pressure posts adapted to engage the respective ends of each of said bars, and gearing arranged in said blocks and connecting said shafts and posts to operate the latter in the movement of the former.

12. In a machine for photographically preparing press plates, a base adapted to fixedly support a sensitized press plate, a negative pressure element adjustable with respect to the base, pressure bars adapted to overlie said element, manually operable means to move the pressure bars toward the element, and automatic means for moving the pressure bars in the opposite direction.

13. In a machine for photographically preparing press plates, a base adapted to fixedly support a sensitized press plate, a negative pressure element adjustable with respect to the base, pressure bars adapted to overlie said element, manually operable means to move the pressure bars toward the element, automatic means for moving the pressure bars in the opposite direction, and adjustable means for limiting the movement of the bars under the influence of the automatic means.

14. In a machine for photographically preparing press plates, a base adapted to fixedly support a sensitized press plate, a pressure member to engage the negative overlying the press plate, slideways for movably supporting the pressure member, tracks carried by the base to movably support the slideways, means for moving the tracks toward and from the base, pressure bars overlying the pressure member, tracks slidably supporting the pressure bars, spring pressed supporting members for the tracks, and means for exerting a pressure on said bars to force the bars toward the press plate.

15. In a machine for photographically preparing press plates, a base adapted to fixedly support a sensitized press plate, a pressure member to engage the negative overlying the press plate, slideways for movably supporting the pressure member, tracks carried by the base to movably support the slideways, means for moving the tracks toward and from the base, pressure bars overlying the pressure member, tracks slidably supporting the pressure bars, spring pressed supporting members for the tracks, and means for exerting a pressure on said bars to force the bars toward the press plate, the track supporting means raising the pressure bars when free to act to a position above and clear of the maximum movement of the pressure member from the press plate.

16. In a machine for photographically preparing offset press plates, a supporting frame, a printing frame pivotally mounted in the supporting frame, means carried by the supporting frame for fixedly limiting the horizontal position of the printing frame, means for retarding the movement of the printing frame from such horizontal position to a vertical position, and means for returning the printing frame from a vertical to a horizontal position.

17. In a machine for photographically preparing offset press plates, a supporting frame, a printing frame pivotally mounted in the supporting frame, means carried by the supporting frame for fixedly limiting the horizontal position of the printing frame, means for retarding the movement of the printing frame from such horizontal position to a vertical position, and manually operable means for returning the printing frame from a vertical to a horizontal position, said latter means including a rack carried by the printing frame, coöperating gearing mounted upon the supporting frame and an operating handle for clutching connection with said gearing.

18. In a machine for photographically preparing offset press plates, a supporting frame, a printing frame pivotally mounted in the supporting frame, means carried by the supporting frame for fixedly limiting the horizontal position of the printing frame, means for retarding the movement of the printing frame from such horizontal position to a vertical position, manually operable means for returning the printing frame from a vertical to a horizontal position, and means for locking the printing frame in a horizontal position with respect to the supporting frame.

In testimony whereof I affix my signature in presence of two witnesses.

ALEXANDER T. KOPPE.

Witnesses:
    AGNES GORDON,
    GEORGE J. OLTSCH.